United States Patent
Levensalor et al.

(10) Patent No.: US 11,979,339 B1
(45) Date of Patent: May 7, 2024

(54) MODULAR SCHEDULERS AND ASSOCIATED METHODS

(71) Applicant: Cable Television Laboratories, Inc., Louisville, CO (US)

(72) Inventors: Randy Levensalor, Boulder, CO (US); Mark Bridges, Brooks, GA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/406,963

(22) Filed: Aug. 19, 2021

Related U.S. Application Data

(60) Provisional application No. 63/224,693, filed on Jul. 22, 2021, provisional application No. 63/067,549, filed on Aug. 19, 2020.

(51) Int. Cl.
*H04L 49/253* (2022.01)
*H04L 69/18* (2022.01)

(52) U.S. Cl.
CPC ............ *H04L 49/254* (2013.01); *H04L 69/18* (2013.01)

(58) Field of Classification Search
CPC ................................ H04L 49/254; H04L 69/18
See application file for complete search history.

(56) References Cited

U.S. PATENT DOCUMENTS

| | | | | |
|---|---|---|---|---|
| 5,712,851 A | * | 1/1998 | Nguyen | H04Q 11/0478 370/399 |
| 5,974,465 A | * | 10/1999 | Wong | H04L 49/90 709/240 |
| 6,862,622 B2 | * | 3/2005 | Jorgensen | H04L 1/20 709/229 |
| 8,069,465 B1 | * | 11/2011 | Bartholomay | H04W 28/24 725/74 |
| 2002/0029238 A1 | * | 3/2002 | Okuhata | G06Q 10/109 718/101 |
| 2007/0098007 A1 | * | 5/2007 | Prodan | H04N 21/6377 348/E7.07 |
| 2007/0208848 A1 | * | 9/2007 | Bhesania | H04L 45/00 709/224 |
| 2010/0061235 A1 | * | 3/2010 | Pai | H04L 47/10 370/230.1 |
| 2014/0213371 A1 | * | 7/2014 | Jain | A63F 13/63 463/42 |
| 2015/0098332 A1 | * | 4/2015 | Eriksson | H04W 8/04 370/235 |
| 2016/0119898 A1 | * | 4/2016 | Lou | H04L 12/189 370/312 |
| 2017/0019241 A1 | * | 1/2017 | Jin | H04B 3/32 |
| 2017/0265216 A1 | * | 9/2017 | Andreoli-Fang | H04W 72/52 |

(Continued)

FOREIGN PATENT DOCUMENTS

| | | | | |
|---|---|---|---|---|
| KR | 100897853 B1 | * | 5/2009 | ......... H04L 12/2898 |
| WO | WO-2016118164 A1 | * | 7/2016 | |

*Primary Examiner* — Shah M Rahman
(74) *Attorney, Agent, or Firm* — PdZ Patent Law, PLLC

(57) ABSTRACT

A method for scheduling data transmission in a communication network includes (1) using a first scheduler module, scheduling first data packets for transmission via a first communication medium, (2) using a second scheduler module, scheduling second data packets for transmission via the first communication medium, and (3) using a coordinator, allocating transmission resources of the first communication medium among at least the first and second scheduler modules.

23 Claims, 13 Drawing Sheets

(56) References Cited

U.S. PATENT DOCUMENTS

| | | | |
|---|---|---|---|
| 2018/0270103 A1* | 9/2018 | Chapman | H04L 43/0847 |
| 2020/0007449 A1* | 1/2020 | Morin | H04L 69/22 |
| 2020/0099548 A1* | 3/2020 | Andreoli-Fang | H04L 12/2861 |
| 2020/0245293 A1* | 7/2020 | Peisa | H04W 76/11 |
| 2021/0029752 A1* | 1/2021 | Ohlsson | H04W 8/08 |
| 2021/0084523 A1* | 3/2021 | Kucera | H04W 28/06 |
| 2021/0175925 A1* | 6/2021 | Tarighat Mehrabani | H04B 3/36 |
| 2021/0243639 A1* | 8/2021 | Sanaullah | H04B 17/318 |
| 2021/0243676 A1* | 8/2021 | Files | H04W 28/08 |
| 2021/0282082 A1* | 9/2021 | Mildh | H04W 36/14 |
| 2021/0409102 A1* | 12/2021 | Tarighat Mehrabani | H04B 7/15521 |
| 2022/0030511 A1* | 1/2022 | Wang | H04L 65/762 |
| 2022/0053491 A1* | 2/2022 | Sevindik | H04L 27/0002 |
| 2022/0053607 A1* | 2/2022 | Rice | H04W 88/06 |
| 2022/0159621 A1* | 5/2022 | Awad | H04W 72/14 |

* cited by examiner

MODULAR SCHEDULERS AND ASSOCIATED METHODS

RELATED APPLICATIONS

This application claims benefit of priority to each of (a) U.S. Provisional Patent Application Ser. No. 63/067,549, filed on Aug. 19, 2020, and (b) U.S. Provisional Patent Application Ser. No. 63/224,693, filed on Jul. 22, 2021. Each of the aforementioned patent applications is incorporated herein by reference.

BACKGROUND

Communication networks are very common in modern society. For example, access communication networks are widely used to provide communication services, such as Internet service, telephone service, video service, etc., to end users in respective geographic areas. As another example, long-haul communication networks are extensively used to transport data across long distances, such as across continents or across oceans.

Communication networks are commonly modeled using an open systems interconnection (OSI) model, where each node in the network is represented by an OSI layer stack. The OSI layer stack makeup will vary among applications, but the layer stack typically includes at least some of the following layers in order from bottom to top, as illustrated in FIG. 1: (1) a physical layer 102, (2) a data link layer 104, (3) a network layer 106, (4) a transport layer 108, (5) a session layer 110, (6) a presentation layer 112, and (7) an application layer 114.

Physical (PHY) layer 102, also referred to as "layer 1," facilitates transfer of data symbols across a physical communication medium (e.g., a cable or free space), such as by defining interfaces with the communication medium, controlling bit rate, controlling synchronization, etc. Data link layer 104, also referred to as "layer 2," may encode transmission entities received from upper layers into bits for the physical layer. Additionally, data link layer 104 may decode bits received from the physical layer into transmission entities for upper layers. Furthermore, data link layer 104 may provide transmission protocol and management, frame synchronization, and flow control. Data link layer 104 often includes two sublayers, i.e., a medium access control (MAC) sublayer 116 and a logical link control (LLC) sublayer 118. MAC sublayer 116 provides flow control and multiplexing for a transmission medium, and LLC sublayer 118 provides flow control and multiplexing for a logical link. MAC sublayer 116 sometimes includes two constituent elements (not shown), i.e., an upper MAC and a lower MAC. The upper MAC interacts with LLC sublayer 118, and the lower MAC interacts with PHY layer 102. Network layer 106, also referred to as "layer 3," provides switching and routing, and transport layer 108, also referred to as "layer 4," helps ensure complete data transfer. Session layer 110, also referred to as "layer 5," controls connections between applications, and presentation layer 112, also referred to as "layer 6," translates between an application format and a network format. Finally, application layer 114, also referred to as "layer 7," supports application processes.

As one example of network operation according to the OSI model, consider a network where device A sends data to device B over a communication medium C. At device A, data travels down device A's OSI layer stack from its application layer to its physical layer. The data then travels from device A's physical layer to device B's physical layer via communication medium C, and the data then travels up device B's OSI layer stack from its physical layer to its application layer.

DETAILED DESCRIPTION OF THE EMBODIMENTS

Figure 1:
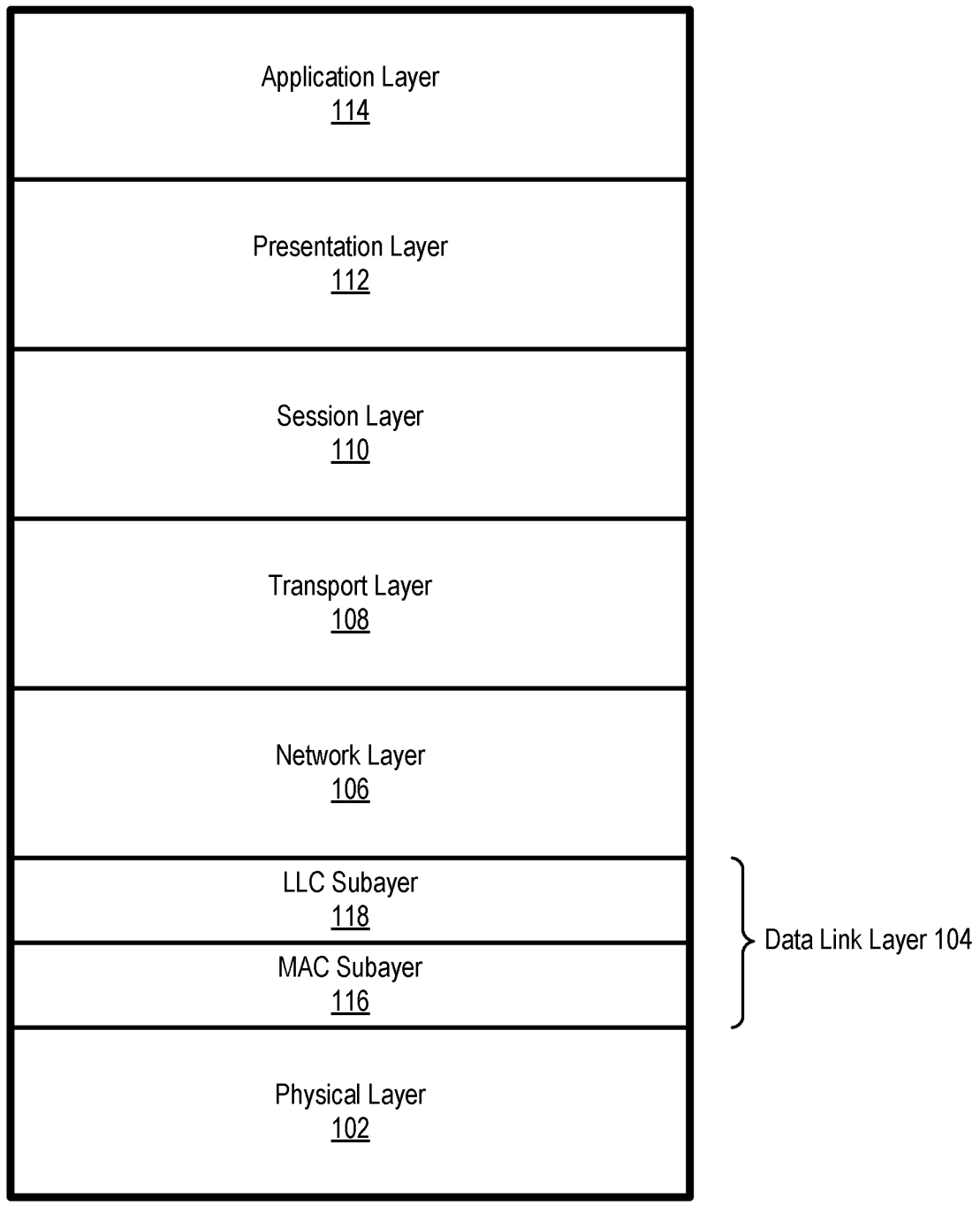
FIG. 1 is an illustration of a prior art open systems interconnection (OSI) model layer stack.

It is frequently desirable for a communication network to be capable of handling data packets in a non-uniform manner. For example, quality of service (QoS) requirements may vary among data packets, and it may therefore be desirable for a communication network to handle data packets in a manner commensurate with their respective QoS requirements. Additionally, communication networks increasingly need to support two or more different data transmission protocols on a common communication medium. For example, a cable communication network may need to support two or more different Data Over Cable Service Interface Specification (DOCSIS) data transmission protocols on a common communication medium. As another example, a communication network may need to support a wireline data transmission protocol and a wireless transmission protocol on a common communication medium, such as to achieve converged wireline and wireless data transmission.

Conventional communication networks supporting multiple data transmission protocols on a common communication medium include a single scheduler for handling the multiple data transmission protocols. Such conventional schedulers are complex, are not readily scalable, and may be difficult (or impossible) to upgrade without disrupting communication network operation.

Disclosed herein are new modular schedulers and associated methods which at least partially overcome one or more of the above-discussed drawbacks of conventional schedulers. The new modular schedulers include a plurality of scheduler modules. For example, some embodiments include a respective scheduler module for each data transmission protocol handled by the scheduler. As another example, some embodiments include a respective scheduler module for at least two different QoS designators handled by the scheduler. As another example, some embodiments include a respective scheduler module for at least two different classes of data flows handled by the scheduler. As an additional example, some embodiments include a respective scheduler for at least two different termination devices handled by the scheduler. The new schedulers optionally further include a coordinator configured to allocate communication medium resources, such as communication medium transmission time and/or communication medium frequency (or wavelength), among multiple scheduler modules. Additionally, some embodiments further include a multiplexer/demultiplexer configured to direct control messages to an appropriate scheduler module and to interface multiple scheduler modules with one or more shared elements (e.g., a shared MAC data plane, a shared PHY layer, and/or a shared communication medium).

The new modular schedulers may achieve significant advantages that cannot be realized by conventional schedulers. For example, in some embodiments, additional scheduler modules can be added without impacting operation of existing scheduler modules, thereby facilitating ease of scheduler upgrade to support evolving communication network requirements. For instance, assume that a new data transmission protocol needs to be supported in a communication network. In certain embodiments of the new modular schedulers, a new scheduler module can be added to support the new data transmission protocol without taking the existing scheduler modules offline, thereby enabling the scheduler to be upgraded without disrupting communication network operation. A conventional scheduler, in contrast, cannot be upgraded in such a non-disruptive manner.

As another example, some embodiments of the new modular schedulers enable an existing scheduler module to be terminated without impacting other scheduler modules. For example, assume that an existing data transmission protocol is being retired. In certain embodiments of the new modular schedulers, a scheduler module handling the data transmission protocol to be retired could be terminated without affecting other scheduler modules, thereby eliminating unnecessary scheduler activity, which helps minimize use of computing resources and energy required for the computing resources. Additionally, terminating an unneeded scheduler module may eliminate licensing costs associated with the scheduler module's operation. A conventional scheduler, in contrast, typically cannot be readily modified to remove unneeded scheduler functionality.

Furthermore, some embodiments are capable of dynamically instantiating and/or terminating scheduler modules, such as based on changing communication network requirements and/or operating conditions, thereby helping ensure that the modular scheduler has an optimum configuration for its current operating environment. For example, assume that a new termination device is connected to a communication network and that the new termination devices requires a data transmission protocol that is not currently used in the communication network. In certain embodiments of the new modular schedulers, the communication network generates a signal indicating that a new scheduler module is needed, and the modular scheduler automatically instantiates a new scheduler module to support the new data transmission protocol, in response to the signal. As another example, assume that a sole termination device requiring a given data transmission protocol is removed from a communication network. In some embodiments, the communication network generates a signal indicating that the scheduler module associated with the data transmission protocol is no longer needed, and the modular scheduler automatically terminates the associated scheduler module in response to the signal.

Moreover, the modular nature of the new schedulers may facilitate scheduler module updates. For example, some embodiments support scheduler module updates (or scheduler module modifications) on an individual scheduler module basis, thereby enabling a particular scheduler module to be updated and/or modified without affecting other scheduler modules. Accordingly, the new modular schedulers may enable scheduler updates or modifications at a higher level of granularity than is possible with conventional schedulers. Furthermore, certain embodiments are capable of pulling scheduler module updates from a remote source, i.e., obtaining updates from the remote source at the discretion of the scheduler, in addition to, or in place of, relying on the remote source to push updates to the scheduler.

Additionally, some embodiments are configured to automatically change scheduler configuration, such as by adding or removing scheduler modules, or by individually changing scheduler module configurations, in response to communication network analytics. For example, assume that communication network analytics indicate that one or more scheduler modules are overloaded. Particular embodiments of the new modular schedulers may be configured to automatically instantiate a new scheduler module in response to these analytics, thereby alleviating the scheduler module overloading. As another example, assume that communication network analytics indicate that a particular class of data flows would benefit from low latency handling. Some embodiments of the new modular schedulers may be configured to automatically instantiate a new scheduler module to perform low-latency scheduling of the data flows in response to these analytics, thereby automatically improving communication network performance. As yet another example, assume that communication network analytics indicate that a scheduler has excess capacity. Certain embodiments of the new modular schedulers may be configured to automatically terminate one or more scheduler modules in response to the communication network analytics, thereby helping minimize required computing resources and associated energy consumption.

Figure 2:
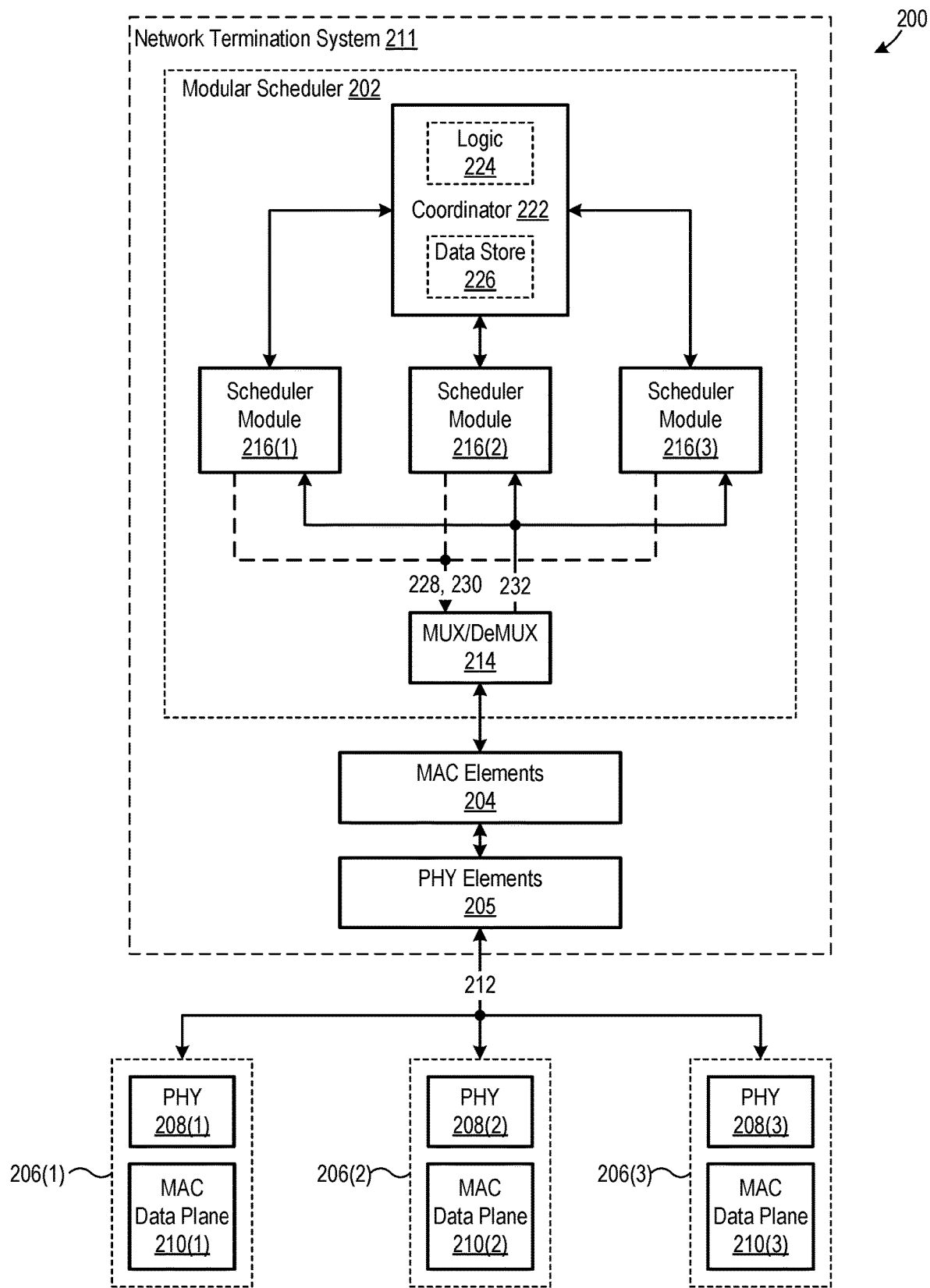
FIG. 2 is a block diagram of a communication network including a modular scheduler, according to an embodiment.

FIG. 2 is a block diagram of a communication network 200 including a modular scheduler 202, MAC elements 204, PHY elements 205, and termination devices 206(1), 206(2), and 206(3). In this document, specific instances of an item may be referred to by use of a numeral in parentheses (e.g., termination device 206(1)) while numerals without parentheses refer to any such item (e.g., termination devices 206). Modular scheduler 202, MAC elements 204, and PHY elements 205 are part of a network termination system 211. In some embodiments, network termination system 211 includes, or is part of, a modem termination system, a digital subscriber line access multiplexer (DSLAM), an optical line terminal (OLT), a cellular wireless communication core (e.g., an evolved packet core (EPC), a fifth generation (5G) cellular wireless communication core, and/or a sixth generation (6G) cellular wireless communication core), a satellite wireless communication ground station, and/or the like. Network termination system 211 can (and typically will) include additional elements, such as to support additional OSI stack layers, but these additional elements are not shown in FIG. 2 for illustrative clarity. MAC elements 204 encompass MAC sublayer elements in addition to modular scheduler 202, and the configuration of MAC elements 204 is implementation dependent. For example, in some embodiments, such as discussed below with respect to FIG. 5, multiple MAC control planes share a common MAC data plane, while in some other embodiments, such as discussed below with respect to FIGS. 6 and 7, each MAC control plane is associated with a respective MAC data plane.

PHY elements 205 include one or more PHY layers, and the number of PHY layers is implementation dependent. For example, in some embodiments, such as discussed below with respect to the FIGS. 5 and 6, multiple MAC planes share a common PHY layer, while in some other embodiments, such as discussed below with respect to FIG. 7, each MAC plane is associated with a respective PHY layer.

Communication medium 212 communicatively couples network termination system 211 with each termination device 206, such as in a point-to-multi-point topology. Communication medium 212 may be a single communication medium, or communication medium 212 may include two or more different communication mediums which need not be of the same type. Examples of communication medium 212 include, but are not limited to, one or more of an optical cable, an electrical cable (e.g., a coaxial electrical cable, a telephone electrical cable, an Ethernet electrical cable, and/or a power line electrical cable), and free space (e.g., for transmission of optical communication signals or radio frequency wireless communication signals). Communication medium 212 may also include supporting elements such as amplifiers, splitters, repeaters, conversion devices (e.g., fiber nodes, remote terminals, and/or optical network units (ONUs)), etc., without departing from the scope hereof.

Each termination device 206 includes a respective PHY layer 208 and a respective MAC data plane 210. Each termination device 206 can (and typically will) include additional elements, such as to support additional OSI stack layers, but these additional elements are not shown in FIG. 2 for illustrative clarity. Each termination device 206 need not have the same configuration. In some embodiments, one or more of termination devices 206 is a modem, and examples of possible modems include, but are not limited to, a cable modem, a digital subscriber line (DSL) modem, and a wireless modem (e.g., for interfacing one or more clients with a Wi-Fi wireless communication link, cellular wireless communication link, satellite wireless communication link, Bluetooth wireless communication link, and/or LoRa wireless communication link). However, termination devices 206 are not limited to being modems, and one or more of termination devices 206 could instead by another type of termination device, including but not limited to, an ONU, an optical network termination (ONT), a fiber node, a remote terminal, a wireless base station, and/or a gateway. Termination devices 206 could be free-standing devices, or termination devices 206 could be incorporated in one or more additional devices (not shown). For example, in some embodiments, termination devices 206 are integrated within respective computing devices, communication devices, network devices, entertainment devices, Internet of Things (IoT) devices, etc. Although FIG. 2 illustrates communication network 200 as including three termination devices 206, the number of termination devices 206 of communication network 200 could vary, as long as communication network 200 includes at least one termination device 206.

Examples of data transmission protocols supported by communication network 200 include, but are not limited to, a cable data transmission communication protocol (e.g., a DOCSIS data transmission protocol), a DSL data transmission protocol, an optical data transmission protocol (e.g., an Ethernet passive optical network (EPON) data transmission protocol, a radio frequency of over glass (RFOG or RFoG) data transmission protocol, or a Gigabit-capable passive optical network (GPON) data transmission protocol), a cellular wireless data transmission protocol operating in licensed or unlicensed radio frequency spectrum (e.g., a long terminal evolution (LTE) data transmission protocol, a 5G data transmission protocol, or a 6G data transmission protocol), a Wi-Fi wireless data transmission protocol, a satellite wireless data transmission protocol, a Bluetooth wireless data transmission protocol, a Universal Series Bus (USB) data transmission protocol, a home networking data transmission protocol (e.g., a Multi-Media over Coax (MoCA) data transmission protocol or HomePNA (G.hn) data transmission protocol), and/or any variations, improvements, and/or evolutions thereof. Additionally, communication network 200 may support transmission of data packets according to two or more different data transmission protocols, including two or more of the aforesaid data transmission protocols, via communication medium 212.

Modular scheduler 202 includes a MUX/DeMUX 214, a plurality of scheduler modules 216, and a coordinator 222. Although FIG. 2 depicts modular scheduler 202 as including three scheduler modules 216, the number of scheduler modules 216 included in modular scheduler 202 may vary. Additionally, in some embodiments, modular scheduler 202 may dynamically instantiate and/or dynamically terminate scheduler modules 216, as discussed above.

Each scheduler module 216 is configured to schedule upstream and downstream transmission of a respective class of data packets via communication medium 212, according to an allocation of resources of communication medium 212 specified by coordinator 222. Classes of data packets handled by respective scheduler modules 216 may be differentiated, for example, by associated data transmission protocol, associated data flow, and/or associated termination device 206. For example, in a particular embodiment, scheduler module 216(1) schedules transmission of data packets requiring default scheduling, scheduler module 216(2) schedules transmission of data packets requiring low latency scheduling, and scheduler module 216(3) schedules transmission of data packets associated with wireless base station Xhaul, where "Xhaul" could be backhaul, fronthaul, midhaul, etc. As another example, in another embodiment, scheduler module 216(1) schedules transmission of data packets associated with a first wireline data transmission protocol, scheduler module 216(2) schedules transmission of data packets associated with a second wireline data transmission protocol, and scheduler module 216(3) schedules transmission of data packets associated with a wireless data transmission protocol. As yet another example, in some embodiments, scheduler module 216(1) is configured to schedule data packets associated with termination device 206(1), scheduler module 216(2) is configured to schedule data packets associated with termination device 206(2), and scheduler module 216(3) is configured to schedule data packets associated with termination device 206(3).

Coordinator 222 includes logic 224 and data store 226. Data store 226 includes, for example, one or more of a memory, a database, a shared file, and a message bus. Logic 224 is configured to allocate resources of communication medium 212, such as transmission time of communication medium 212, transmission frequency or wavelength of communication medium 212, and/or transmission phase of communication medium 212, to each scheduler module 216 by writing respective grants in data store 226 for each scheduler module. Examples of possible grants include, but are not limited to, channel grants, slot grants, mini-slot grants, and time slice grants. Each scheduler module 216 need not receive the same type of grant from coordinator 222. Logic 224 writes grants, for example, according to allocation parameters which may either be static or dynamic. The allocation parameters are configured, for example, at least partially based on predefined business logic, real time requests from scheduler modules 216, and/or machine learning prediction of future scheduling needs.

As one example of operation of coordinator 222, assume that scheduler module 216(1) is configured to handle data packets requiring default scheduling and that scheduler module 216(2) is configured to handle data packets requiring low latency handing. Logic 224 may write respective grants in data store 226 for each of scheduler modules 216(1) and 216(2) in a manner which give scheduler module 216(2) priority over scheduler module 216(1) for resources of communication medium 212, thereby helping minimize latency in transmission of data packets requiring low latency. As another example, assume that scheduler modules 216(1), 216(2), and 216(3) schedule transmission of data packets associated with termination devices 206(1), 206(2), and 206(3), respectively. Additionally, assume that (1) a customer associated with termination device 206(1) subscribes to a premium service tier, (2) a customer associated with termination device 206(2) subscribes to a mid-level service tier, and (3) a customer associated with termination device 206(3) subscribes to an economy service tier. Logic 224 may write respective grants in data store 226 for each of scheduler modules 216(1)-216(3) in a manner which give scheduler module 216(1) priority over each of scheduler modules 216(2) and 316(3) for resources of communication medium 212, thereby providing premium service to termination device 206(1). Additionally, logic 224 may write respective grants in data store 226 for each of scheduler modules 216(1)-216(3) in a manner which gives scheduler module 216(2) priority over scheduler module 216(3) for resources of communication medium 212, thereby providing mid-level service to termination device 206(2).

Each scheduler module 216 is configured to schedule transmission of data packets via communication medium 212 in accordance with respective grants for the scheduler module written by logic 224 in data store 226. For example, in some embodiments, each scheduler module 216 is configured to send respective uplink grants from memory 226 to appropriate termination devices 206, to schedule uplink data transmission via communication medium 212. MUX/DeMUX 214 is configured to direct uplink grants 228 (and other control messages) from scheduler modules 216 to termination devices 206 via MAC elements 204, PHY elements 205, and communication medium 212. Additionally, in certain embodiments, each scheduler module 216 is also configured to send respective downlink grants 230 from memory 226 to an appropriate MAC data plane (not shown) of MAC elements 204, or to a common MAC data plane (not shown) of MAC elements 204, to schedule downlink data transmission via communication medium 212.

MUX/DeMUX 214 is additionally configured to direct requests 232 for uplink data transmission grants (and other control messages) from termination devices 206 to an appropriate scheduler module 216 at least partially based on one or more attributes of the requests. For example, assume again that scheduler module 216(1) is configured to schedule transmission of data packets requiring default scheduling and that scheduling module 216(2) is configured to schedule transmission of data packets requiring low latency scheduling. In this example, MUX/DeMUX 214 would direct a request 232 for scheduling a data packet requiring default scheduling to scheduler module 216(1), and MUX/DeMUX 214 would direct a request 232 for scheduling a data packet requiring low latency scheduling to scheduler module 216(2). In some embodiments, MUX/DeMUX 214 determines which scheduler module 216 to direct requests 232 to at least partially based on a data flow identifier, a MAC type, and identity or type of a termination device, and/or an identity or type of an application. The logical location of MUX/DeMUX 214 in network termination system 211 may vary depending on the specific configuration of MAC elements 204 and PHY elements 205.

Figure 3:
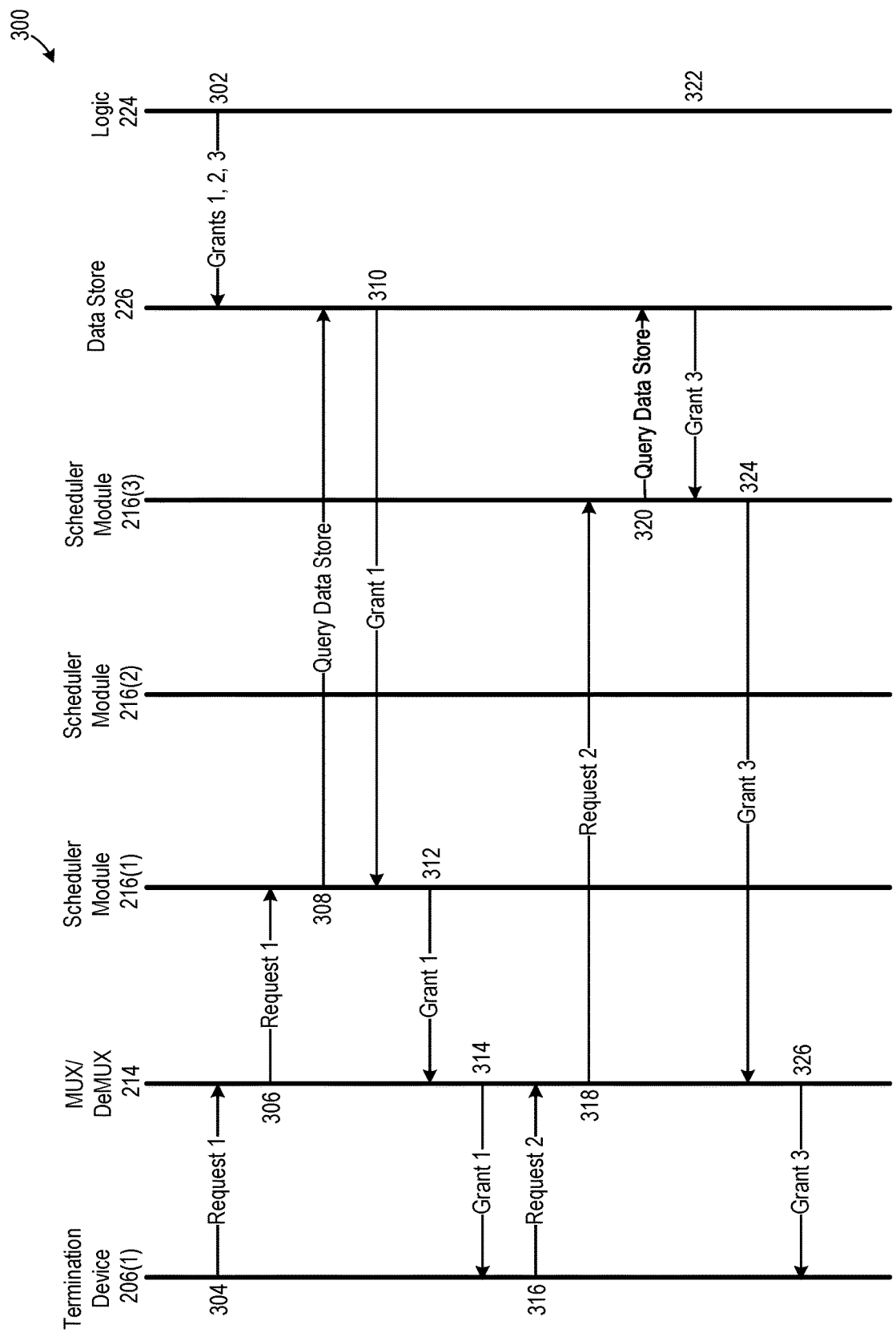
FIG. 3 is a data flow diagram illustrating one example of operation of the FIG. 2 modular scheduler.

FIG. 3 is a data flow diagram 300 illustrating one example of operation of modular scheduler 202 in scheduling uplink data transmission grants. It is understood, however, that modular scheduler 202 is not limited to operating according to the FIG. 3 example. Diagram 300 includes vertical lines logically representing each of termination device 206(1), MUX/DeMUX 214, scheduler module 216(1), scheduler module 216(2), scheduler module 216(3), data store 226, and logic 224. Termination device 206(2), termination device 206(3), MAC elements 204, and PHY elements 205 are not shown in FIG. 3.

In a step 302, logic 224 writes Grants 1, 2, and 3 to data store 226 for scheduler modules 216(1), 216(2), and 216(3), respectively. Logic 224 writes Grants 1, 2, 3, for example, according to allocation parameters which may either be static or dynamic. In a step 304, termination device 206(1) sends a Request 1 for a grant for uplink data transmission to MUX/DeMUX 214. In this example, MUX/DeMUX 214 determines that the data packets associated with Request 1 should be scheduled by scheduler module 216(1), and MUX/DeMUX 214 therefore forwards Request 1 to scheduler module 216(1) in a step 306. In response to receiving Request 1, scheduler module 216(1) queries data store 226 for a grant in step 308, and scheduler module 216(1) reads Grant 1 from data store 226 in step 310. Scheduler module 216(1) sends Grant 1 to MUX/DeMUX 214 in a step 312, and MUX/DeMUX 214 sends Grant 1 to termination device 206(1) in a step 314 via MAC elements 204, PHY elements 205, and communication medium 212 (not shown in FIG. 3). Uplink data transmission in response to Request 1 is scheduled at the conclusion of step 314.

In a step 316, termination device 206(1) sends a Request 2 for a grant for uplink data transmission to MUX/DeMUX 214. In this example, MUX/DeMUX 214 determines that the data packets associated with Request 2 should be scheduled by scheduler module 216(3), and MUX/DeMUX 214 therefore forwards Request 2 to scheduler module 216(3) in a step 318. In response to receiving Request 2, scheduler module 216(3) queries data store 226 for a grant in step 320, and scheduler module 216(3) reads Grant 3 from data store 226 in step 322. Scheduler module 216(3) sends Grant 3 to MUX/DeMUX 214 in a step 324, and MUX/DeMUX 214 sends Grant 3 to termination device 206(1) in a step 326 via MAC elements 204, PHY elements 205, and communication medium 212 (not shown in FIG. 3). Uplink data transmission in response to Request 2 is scheduled at the conclusion of step 326.

Referring again to FIG. 2, the elements of modular scheduler 202 could be partially or fully combined without departing from the scope hereof. Additionally, one or more elements of modular scheduler 202 could be split in two or more sub-elements. For example, each of scheduler modules 216 could be split into a respective uplink scheduler module and a respective downlink scheduler module. Furthermore, the elements of modular scheduler 202 need not be co-packaged or even disposed at a common location. Moreover, modular scheduler 202 could be partially or fully combined with one or more other elements, such as MAC elements 204 and/or PHY elements 205.

Figure 4:
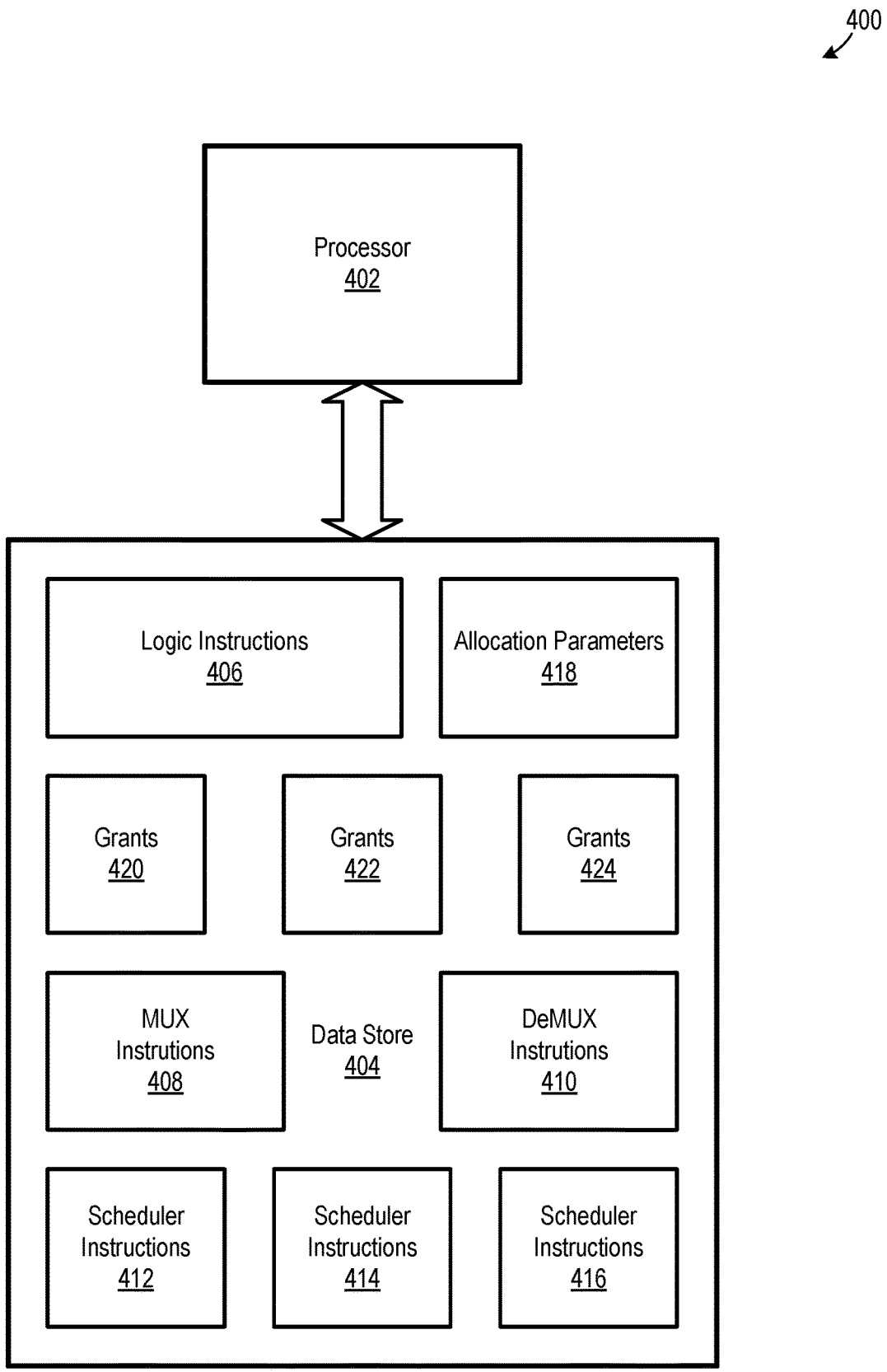
FIG. 4 is a block diagram of one possible embodiment of the FIG. 2 modular scheduler.

In some embodiments, the elements of modular scheduler 202 are implemented by digital electronics and/or analog electronics. For example, in particular embodiments, the elements of modular scheduler 202 are at least partially implemented by purpose-built physical devices, such as application-specific integrated circuits (ASICs). As another example, in certain embodiments, the elements of modular scheduler 202 are software based, virtualized, and/or cloud native. For instance, some embodiments of modular scheduler 202 are at least partially implemented by one or more processors executing instructions, such as in the form of firmware and/or software, stored in one or more memories, to perform the functions of modular scheduler 202. For example, FIG. 4 is a block diagram of a modular scheduler 400, which is one possible embodiment of modular scheduler 202 where modular scheduler 202 is embodied by a processor executing instructions stored in memory. Modular scheduler 400 includes a processor 402 communicatively coupled to a data store 404. Although processor 402 and data store 404 are illustrated as being single elements, each of processor 402 and memory 404 could be implemented by multiple sub-elements that need not by implemented by common hardware or even implemented at a common location. For example, each of processor 402 and data store 404 could be implemented in a distributed computing system, such as in a cloud computing system.

Data store 404 includes logic instructions 406, multiplexing (MUX) instructions 408, demultiplexing (DeMUX) instructions 410, scheduler instructions 412, scheduler instructions 414, and scheduler instructions 416. Data store 404 additionally includes allocation parameters 418 and grants 420, 422, and 424. Processor 402 is configured to execute logic instructions 406 in view of allocation parameters 418 to perform the functions of logic 224 and thereby write grants 420, 422, and 424 to data store 404. Grants 420, 422, and 424 are for scheduler modules 216(1), 216(2), and 216(3), respectively. Allocation parameters 418 at least partially specify how resources of communication medium 212 are to be allocated among scheduler modules 216(1)-216(3). Processor 402 is additionally configured to execute scheduler instructions 412, 414, and 416 to implement scheduler modules 216(1), 216(2), and 216(3), respectively. Furthermore, processor 402 is configured to execute MUX instructions 408 and DeMUX instructions 410 to implement the multiplexing and demultiplexing functions of MUX/DeMUX 214, respectively.

Figure 5:
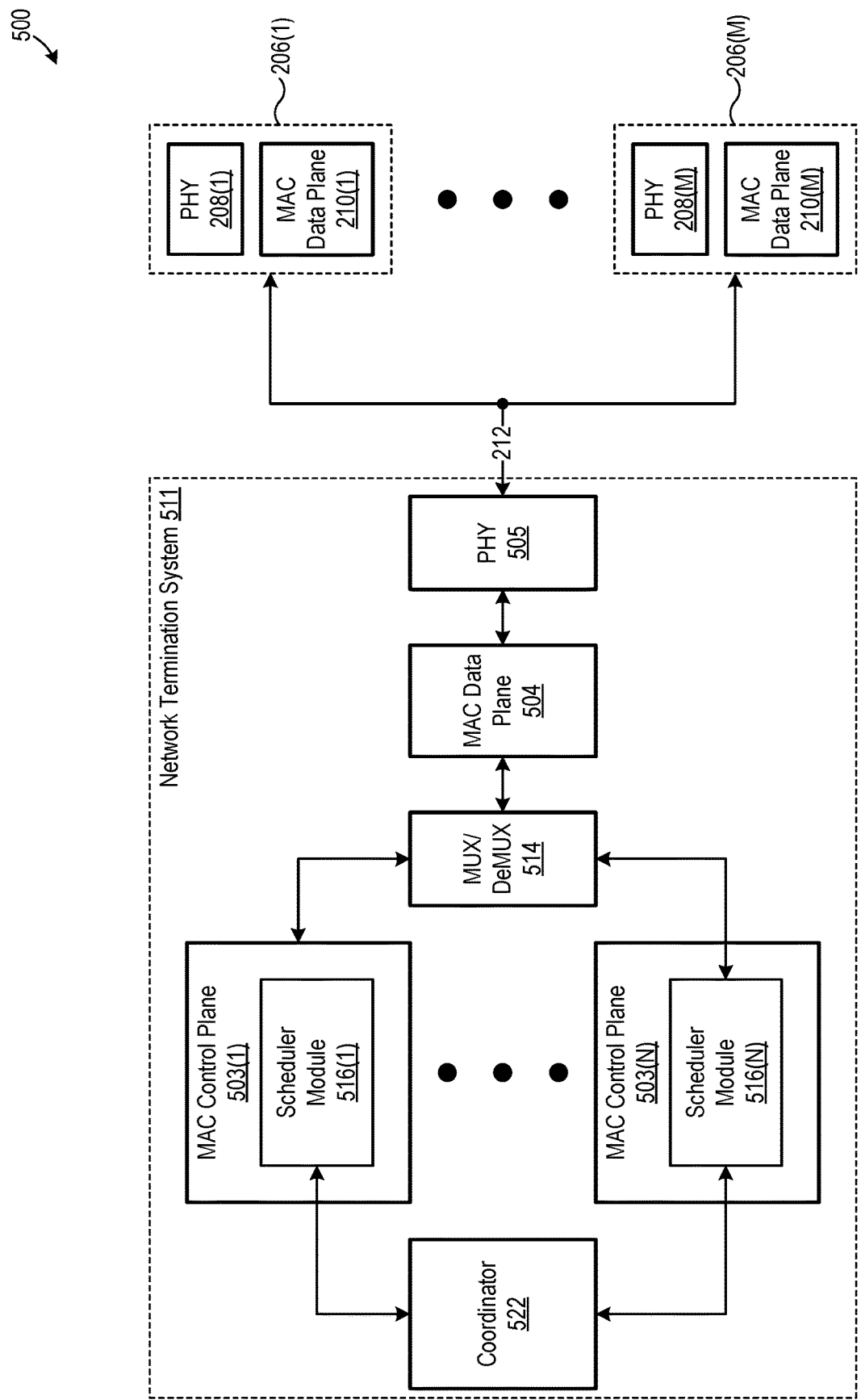
FIG. 5 is a block diagram of an embodiment of the FIG. 2 communication network where a network termination system includes a shared medium access control data plane and a shared physical layer.
Figure 6:
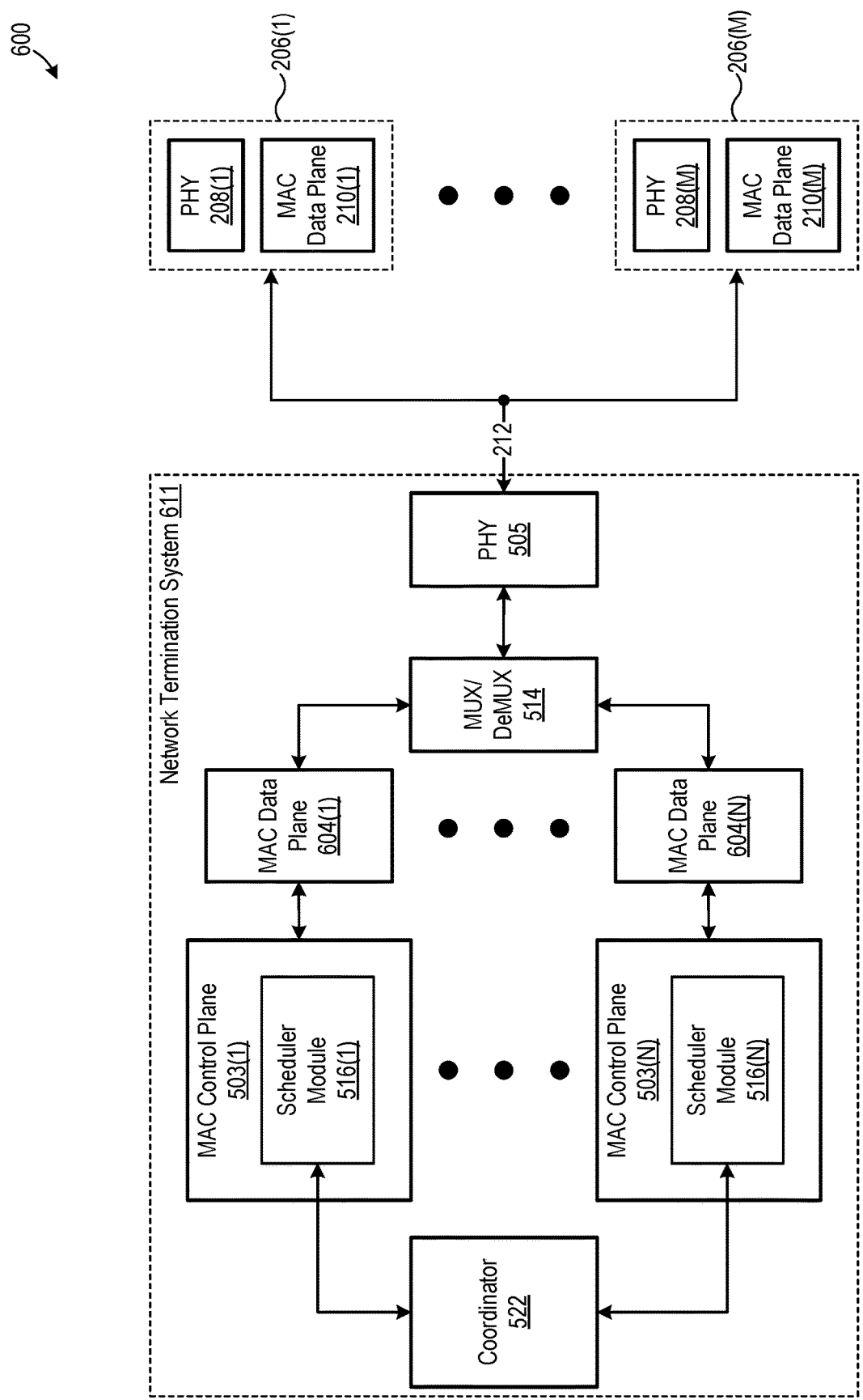
FIG. 6 is a block diagram of an alternate embodiment of the FIG. 5 communication network where a network termination system includes a plurality of medium access control data planes.
Figure 7:
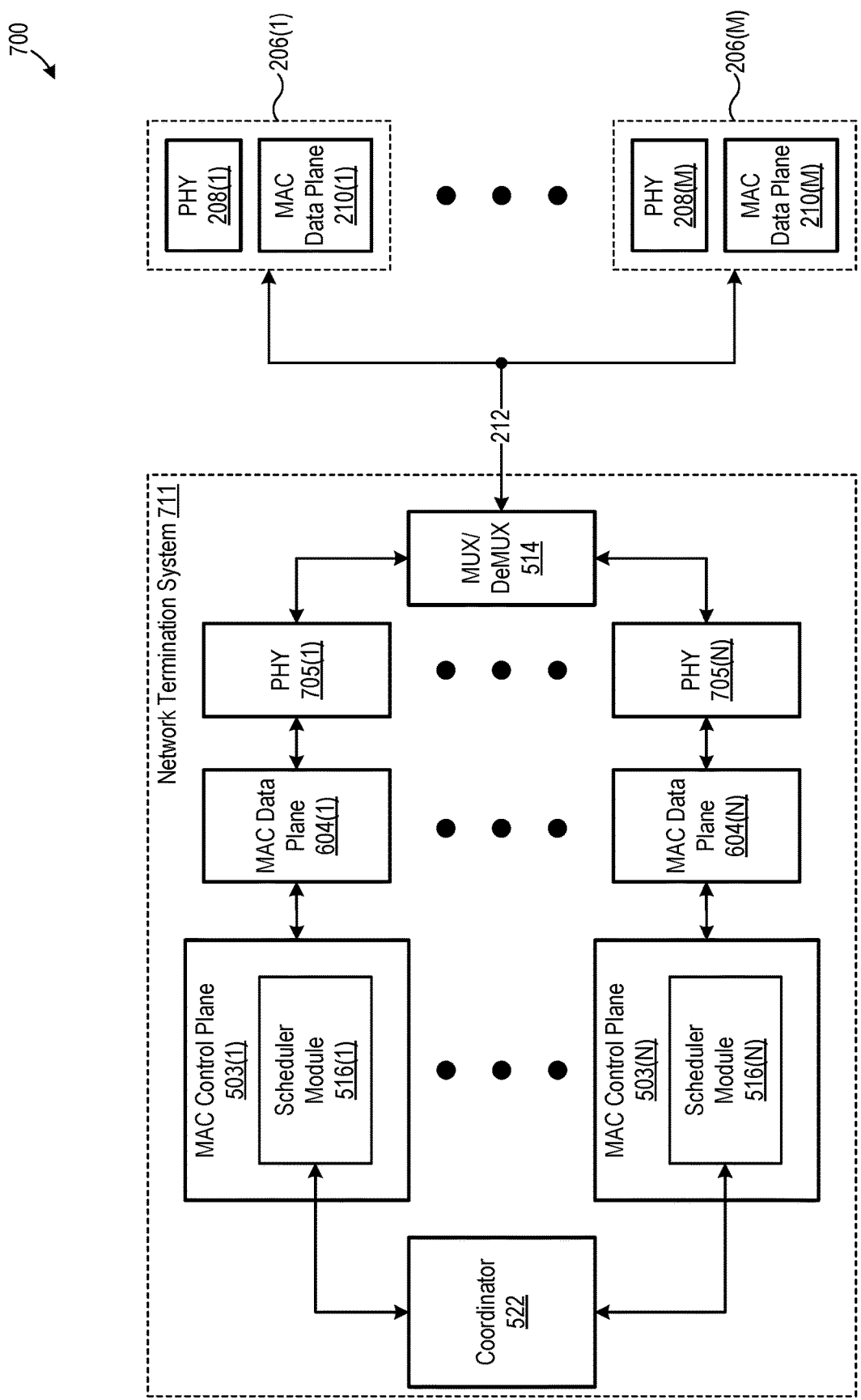
FIG. 7 is a block diagram of an alternate embodiment of the FIG. 6 communication network where a network termination system includes a plurality of physical layers.

Discussed below with respect to FIGS. 5-7 are several possible embodiments of network termination system 211. It is understood, though, that network termination system 211 is not limited to example embodiments of FIGS. 5-7.

FIG. 5 is a block diagram of a communication network 500 including a network termination system 511, an instance of communication medium 212, and M instances of termination devices 206, where M is an integer greater than or equal to one. Network termination system 511 of FIG. 5 is an embodiment of network termination system 211 of FIG. 2, and network termination system 511 includes a physical layer 505, a MAC data plane 504, a MUX/DeMUX 514, N MAC control planes 503, and a coordinator 522, where N is an integer greater than or equal to one. N and M need not have the same values. Physical layer 505, which is an embodiment of physical elements 205 of FIG. 5, is logically coupled between communication medium 212 and MAC data plane 504, and physical layer 505 is shared by all MAC control planes 503. Accordingly, physical layer 505 is configured to facilitate physical transmission of all data packets through communication medium 212 flowing between network termination system 511 and one or more termination devices 206.

MAC data plane 504 is logically coupled between physical layer 505 and MUX/DeMUX 514, and MAC data plane 504 is shared by all MAC control planes 503. Consequently, MAC data plane 504 provides flow control for all data packets through communication medium 212 flowing between network termination system 511 and one or more termination devices 206. MUX/DeMUX 514 is an embodiment of MUX/DeMUX 214 of FIG. 2, and MUX/DeMUX 514 is logically coupled between MAC data plane 504 and each MAC control plane 503. MUX/DeMUX 514 directs grants, requests, and other control messages between MAC control planes 503 and MAC data plane 504. Each MAC control plane 503 includes a respective scheduler module 516, and scheduler modules 516 are an embodiment of scheduler modules 216 of FIG. 2. Each MAC control plane 503 can, and typically will, include additional elements that are not depicted in FIG. 5, such as one or more elements configured to provide security services, authentication services, provisioning services, etc. In some embodiments, two or more MAC control planes 503 are configured to have different authentication provisions and/or different provisioning provisions. Coordinator 522 is an embodiment of coordinator 222 of FIG. 2.

Coordinator 522, scheduler modules 516, and MUX/DEMUX 514 collectively form an embodiment of modular scheduler 202. Accordingly, each scheduler module 516 is configured to schedule transmission of data packets via communication medium 212 in accordance with respective grants generated by controller 522, in a manner like that discussed above with respect to scheduler modules 216 and coordinator 222. The fact that MAC control planes 503 share a common MAC data plane 504 and a common physical layer 505 limits network termination system 511 to supporting a single data transmission protocol, but network termination system 511 can nevertheless schedule data packets according to associated data flow and/or associated termination device 206. For example, two or more scheduler modules 516 could be configured to schedule data packets associated with different respective data flows, and two or more scheduler modules 516 could be configured to schedule data packets associated with different respective termination devices 206.

FIG. 6 is a block diagram of a communication network 600, which is an alternate embodiment of communication network 500 of FIG. 5 where network termination system 511 is replaced with a network termination system 611.

Network termination system 611 differs from network termination system 511 in that (1) shared MAC data plane 504 is replaced with a respective MAC data plane 604 for each MAC control plane 503 and (2) the logical location of MUX/DeMUX 514 is moved to between MAC data planes 604 and physical layer 505. MUX/DeMUX 514 directs grants, requests, and other control messages between MAC data planes 604 and physical layer 505, in network termination system 611.

Each MAC control plane 503 and associated MAC data plane 604 form a respective MAC sublayer (not labeled) in network termination system 611. Accordingly, network termination system 611 includes N MAC sublayers, each with its own scheduler module 516. Scheduler modules 516 and coordinator 522 function in the same manner as scheduler modules 216 and coordinator 222. The fact that network termination system 611 includes a respective MAC data plane 604 for each MAC control plane 503 enables network termination system 611 to support multiple encoding schemes for MAC messages, as well as multiple timing schemes. Additionally, network termination system 611 may support multiple data transmission protocols, as long as each data transmission protocol is compatible with physical layer 505. For example, two or more MAC sublayers may be support different frame encryption methods. As another example, two or more MAC sublayers may support different versions of a common data transmission protocol, such as different versions of a DOCSIS data transmission protocol. Some embodiments of network termination system 611 are configured to support a respective downlink control channel for each MAC data plane 604.

FIG. 7 is a block diagram of a communication network 700, which is an alternate embodiment of communication network 600 of FIG. 6 where network termination system 611 is replaced with a network termination system 711. Network termination system 711 differs from network termination system 611 in that (1) shared physical layer 505 is replaced with a respective physical layer 705 for each MAC control plane 503 and MAC data plane 604 pair, and (2) the logical location of MUX/DeMUX 514 is moved to between physical layers 705 and communication medium 212. MUX/DeMUX 514 directs grants, requests, and other control messages between physical layers 705 and communication medium 212, in network termination system 711.

Scheduler modules 516 and coordinator 522 function in the same manner as scheduler modules 216 and coordinator 222. The fact that network termination system 711 includes a respective physical layer 705 for MAC data plane 604 and MAC control plane 503 pair enables network termination system 711 to support essentially any data transmission protocols and any physical layers that are capable of being transmitted by communication medium 212. For example, network termination system 711 could support both a wireline data transmission protocol and a wireless data transmission protocol operating in common radio frequency spectrum and sharing communication medium 212. Some embodiments of network termination system 711 are configured to support a respective control channel for each MAC sublayer with shared channels for data transmission.

Figure 14:
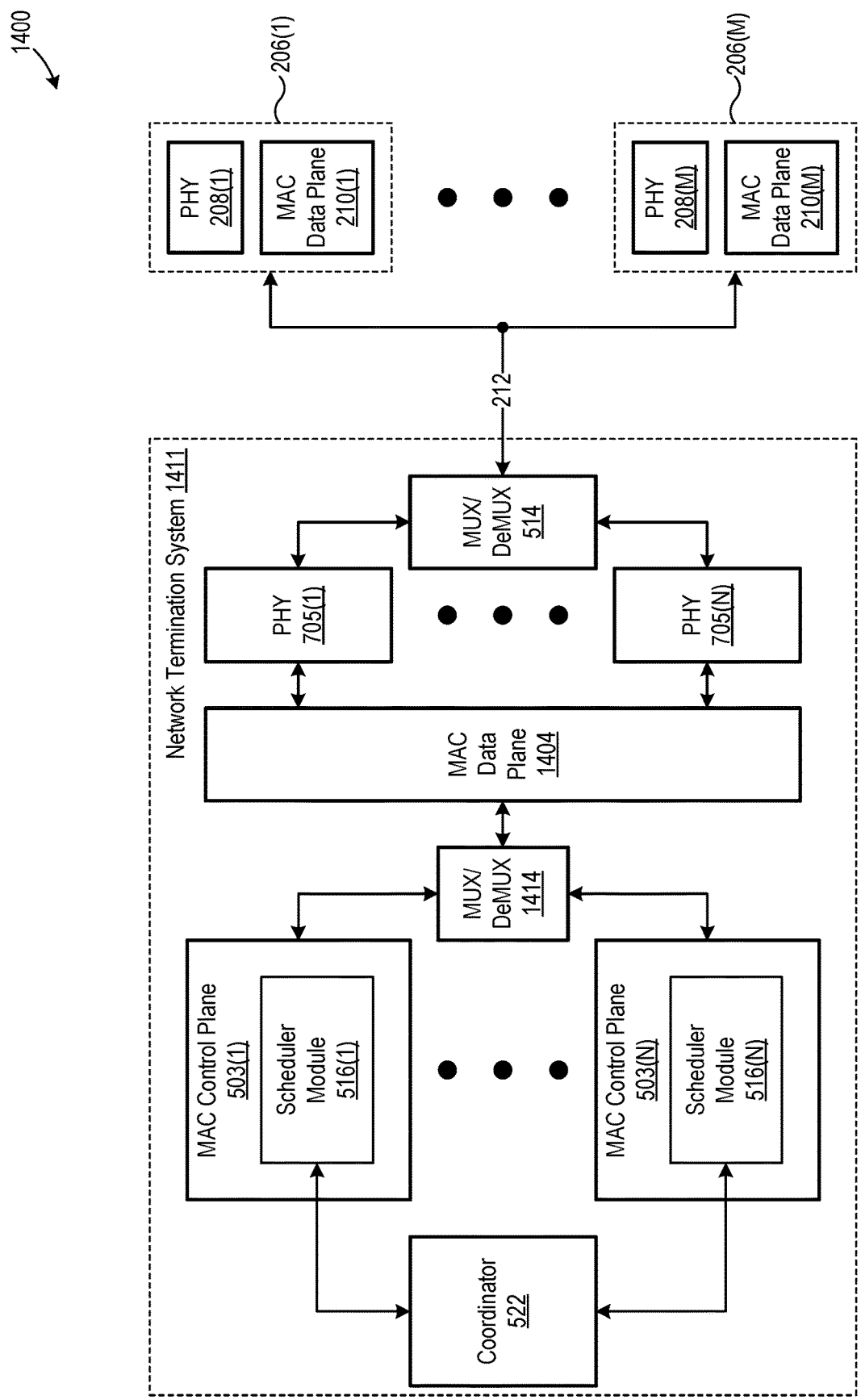
FIG. 14 is a block diagram of an alternate embodiment of the FIG. 7 communication network where a network termination system includes a shared MAC data plane.

FIG. 14 is a block diagram of a communication network 1400, which is an alternate embodiment of communication network 700 of FIG. 7 where network termination system 711 is replaced with a network termination system 1411. Network termination system 1411 differs from network termination system 711 in that (1) the plurality of MAC data planes 604 are replaced with a single shared MAC data plane 1404, and (2) network termination system 1411 includes an additionally MUX/DeMUX 1414 logically coupled between MAC control planes 503 and shared MAC data plane 1404. MUX/DeMUX 1414 directs grants, requests, and other control messages between MAC control planes 503 and shared MAC data plane 1404.

Discussed below with respect to FIGS. 8-11 are several possible embodiments of communication medium 212 and termination devices 206. It is understood, though, that communication networks disclosed herein are not limited to these example embodiments.

Figure 8:
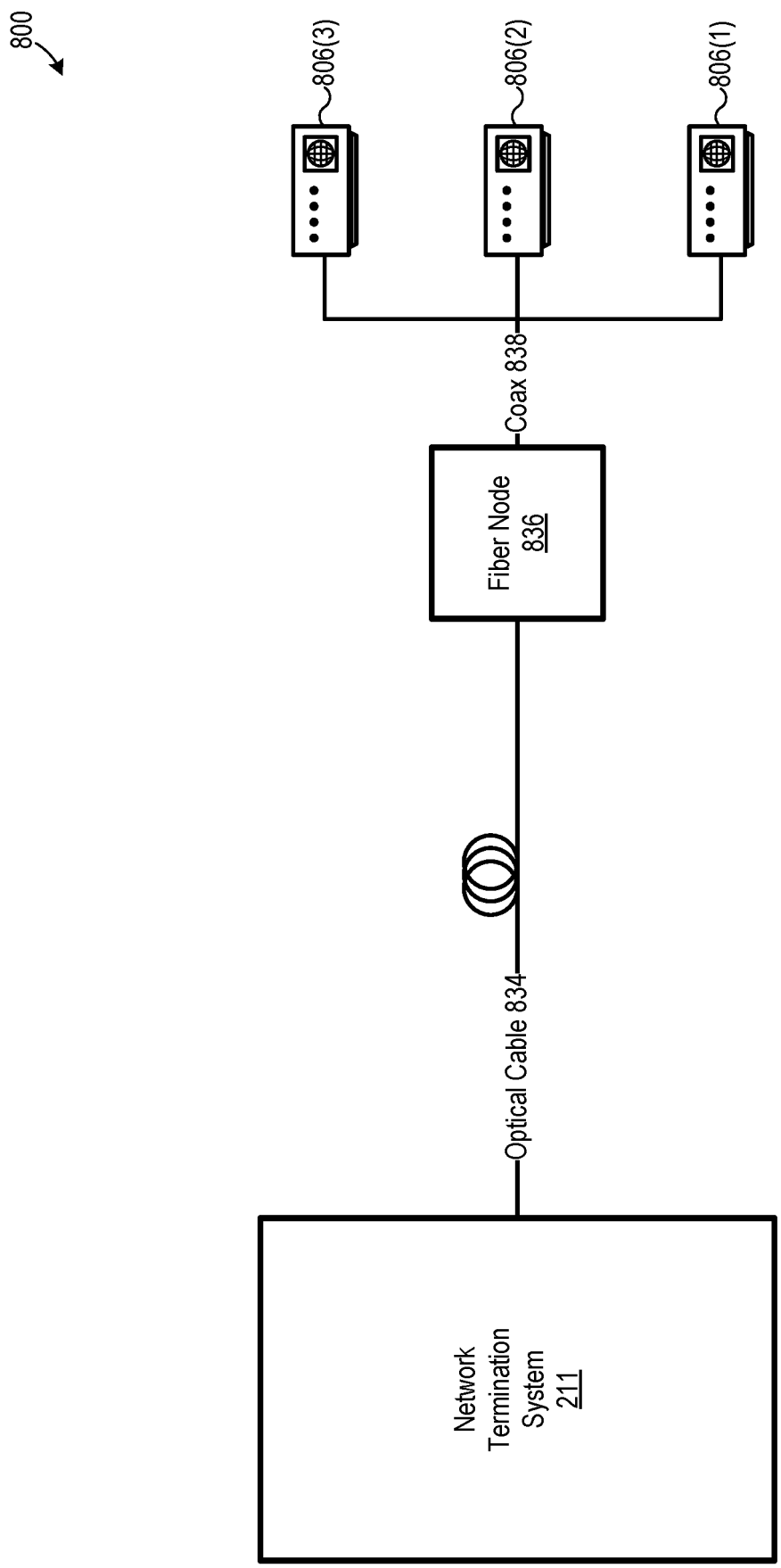
FIG. 8 is a block diagram of an embodiment of the FIG. 2 communication network where a communication medium is embodied by a combination of optical cable, a fiber node, and coaxial electrical cable.

FIG. 8 is a block diagram of a communication network 800, which is an embodiment of communication network 200 of FIG. 2 where communication medium 212 is embodied by a combination of optical cable 834, a fiber node 836, and coaxial electrical cable (coax) 838. Communication network 800 also includes cable modems 806, which are embodiments of termination devices 206 of FIG. 2. Details of network termination system 211 are not shown in FIG. 8. Optical cable 834 communicatively couples network termination system 211 to fiber node 836, and coaxial electrical cable 838 communicatively couples fiber node 836 to each cable modem 806. Fiber node 836 is configured to convert communication signals between the optical domain on optical cable 834 and the electrical domain on coaxial electrical cable 838.

Figure 9:
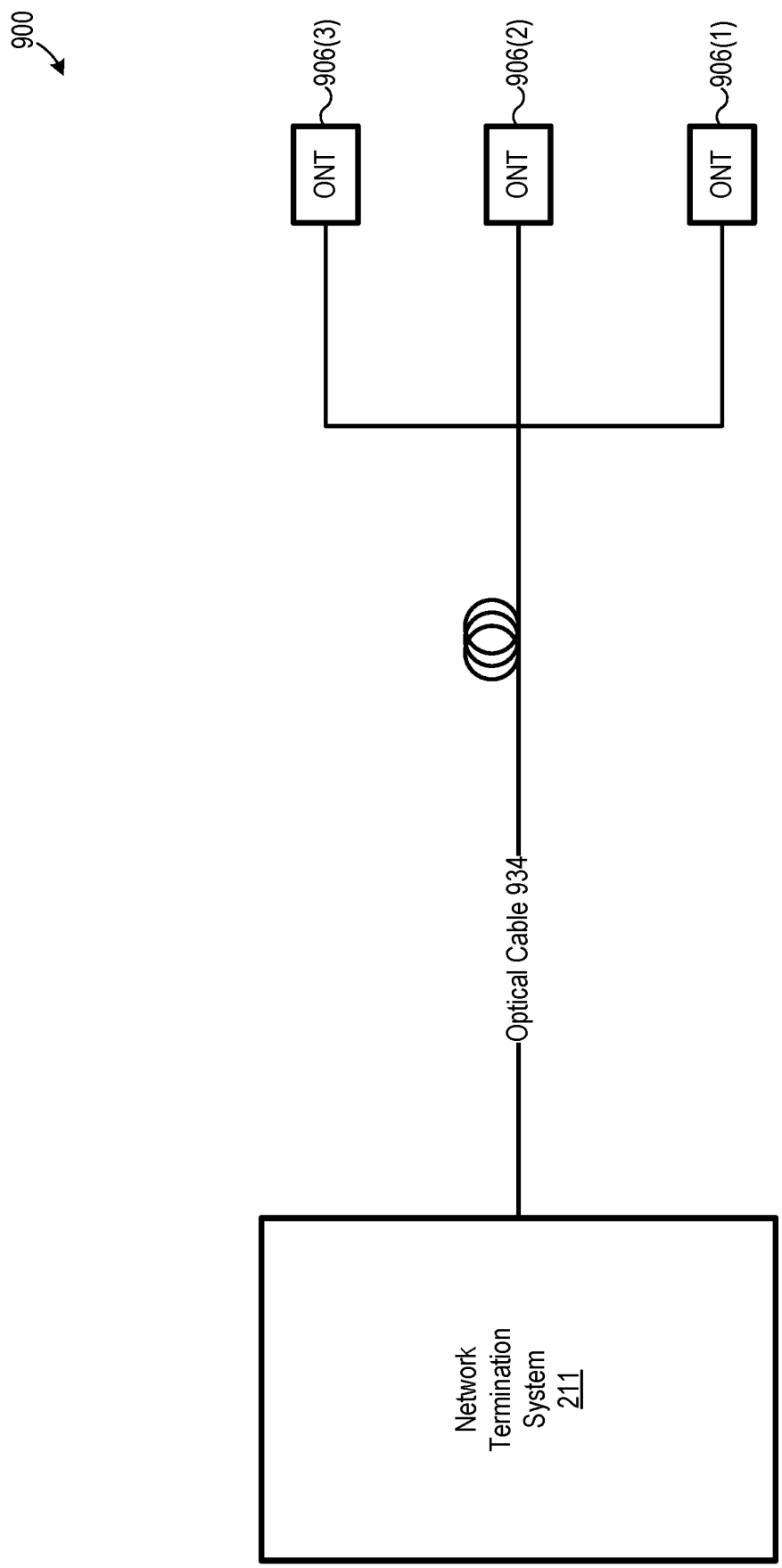
FIG. 9 is a block diagram of an embodiment of the FIG. 2 communication network where a communication medium is embodied by optical cable.

FIG. 9 is a block diagram of a communication network 900, which is an embodiment of communication network 200 of FIG. 2 where communication medium 212 is embodied by optical cable 934. Communication network 900 also includes ONTs 906, which are embodiments of termination devices 206 of FIG. 2. Details of network termination system 211 are not shown in FIG. 9. Optical cable 934 communicatively couples network termination system 211 to each ONT 906.

Figure 10:
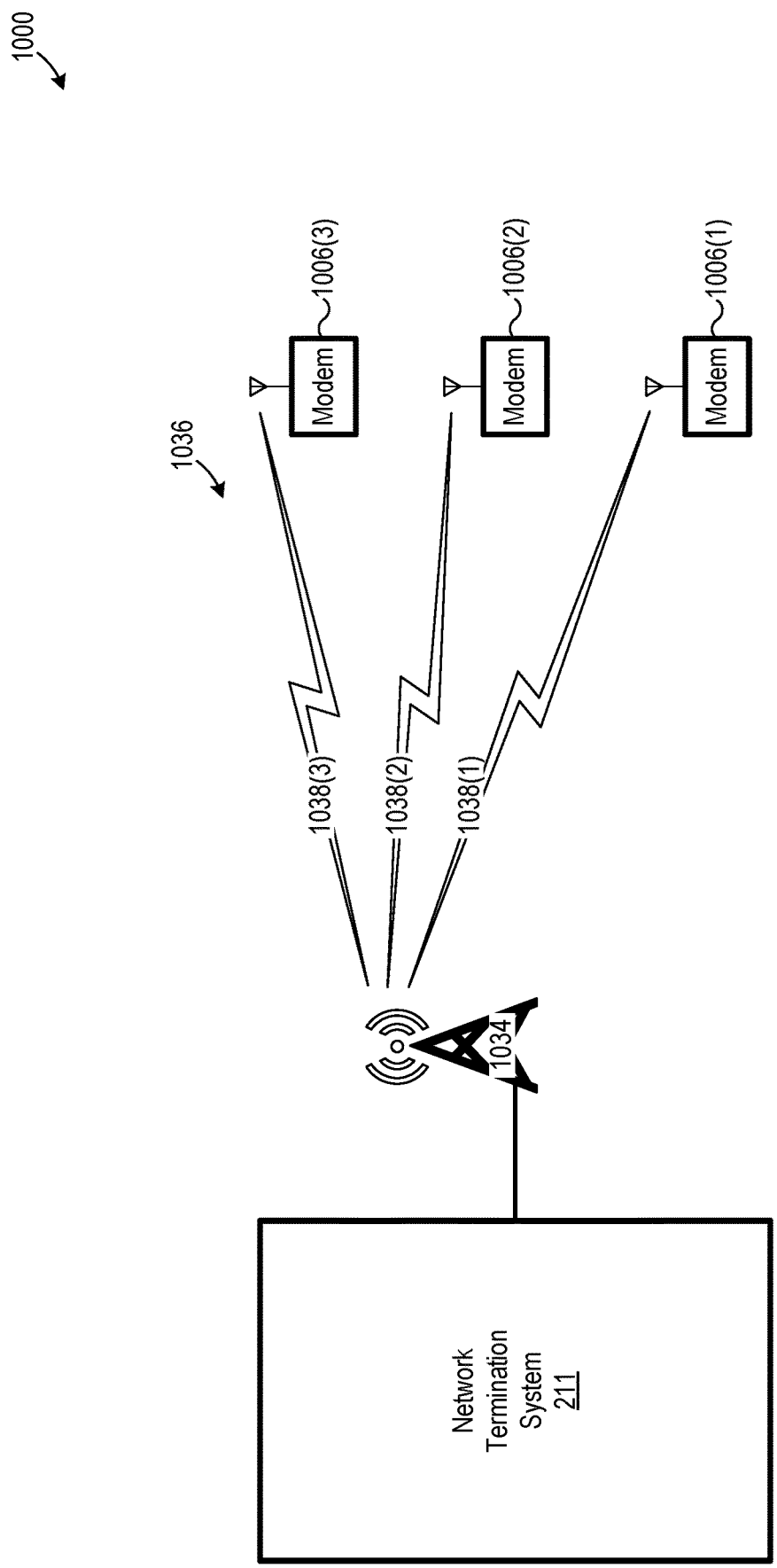
FIG. 10 is a block diagram of an embodiment of the FIG. 2 communication network where a communication medium is embodied by a wireless base station and free space.

FIG. 10 is a block diagram of a communication network 100, which is an embodiment of communication network 200 of FIG. 2 where communication medium 212 is embodied by a wireless base station 1034 and free space 1036. Communication network 1000 also includes wireless modems 1006, which are embodiments of termination devices 206 of FIG. 2. Details of network termination system 211 are not shown in FIG. 10. Wireless base station 1034 is, for example, a cellular wireless base station (e.g., a microcell, a small cell, a microcell, a nanocell, a femtocell, etc.) or a Wi-Fi wireless base station. Data is transmitted through free space 1036 between wireless base station 1034 and wireless modems 1006 via wireless communication signals 1038.

Figure 11:
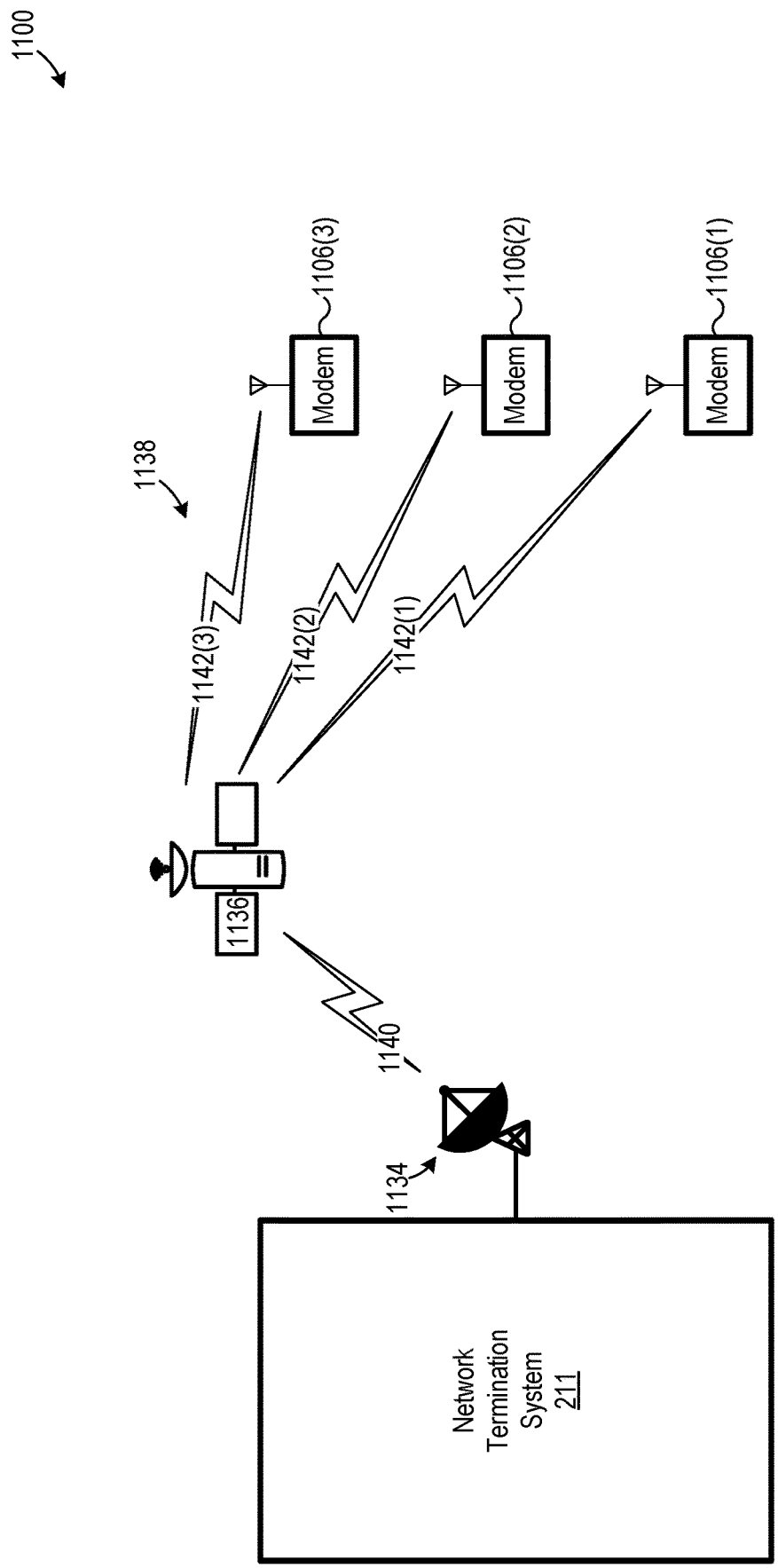
FIG. 11 is a block diagram of an embodiment of the FIG. 2 communication network where a communication medium is embodied by a satellite ground station, a satellite, and free space.

FIG. 11 is a block diagram of a communication network 1100, which is an embodiment of communication network 200 of FIG. 2 where communication medium 212 is embodied by a satellite ground station 1134, a satellite 1136, and free space 1138. Communication network 1100 also includes satellite wireless modems 1106, which are embodiments of termination devices 206 of FIG. 2. Details of network termination system 211 are not shown in FIG. 11. Data is transmitted through free space 1036 between satellite ground station 1134 and satellite 1136 via wireless communication signals 1140, and data is transmitted between satellite 1136 and satellite wireless modems 1106 through free space 1138 via wireless communication signals 1142. Accordingly, satellite 1136 relays data between satellite ground station 1134 and satellite wireless modems 1106.

Figure 12:
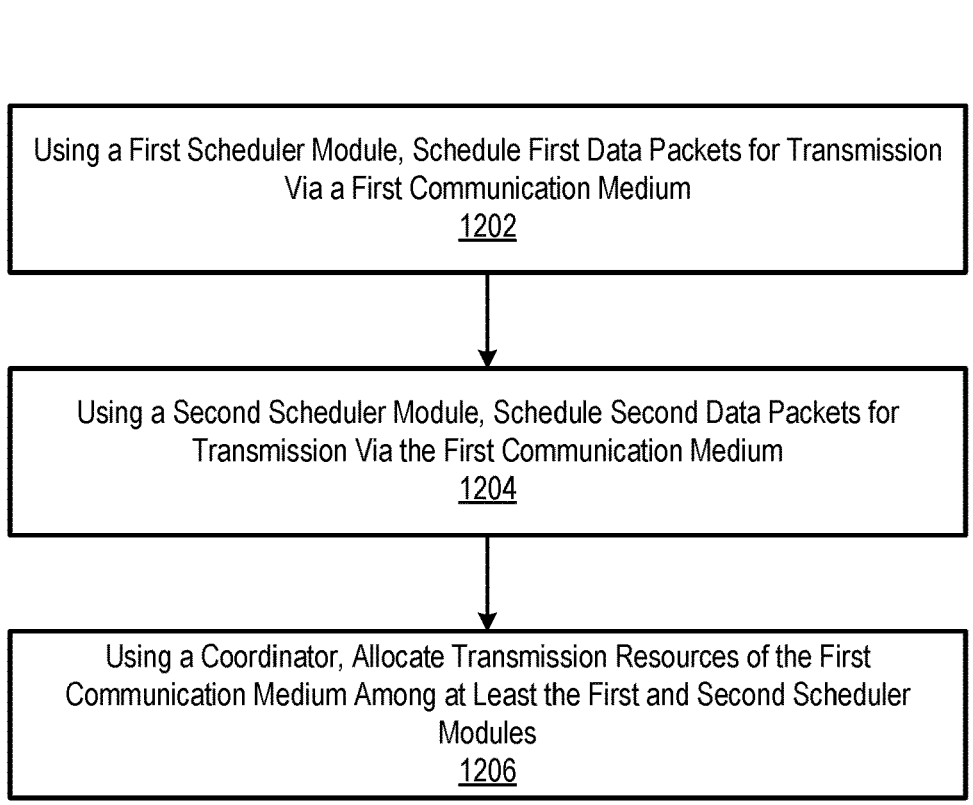
FIG. 12 is a flow chart of a method for scheduling data transmission in a communication network, according to an embodiment.

FIG. 12 is a flow chart of a method 1200 for scheduling data transmission in a communication network. In a block 1202 of method 1200, first data packets are scheduled for transmission via a first communication medium, using a first scheduler module. In one example of block 1202, scheduler module 216(1) schedules first data packets for transmission via communication medium 212. In a block 1204 of method 1200, second data packets are scheduled for transmission via the first communication medium, using a second scheduler module. In one example of block 1202, scheduler module 216(2) schedules second data packets for transmission via communication medium 212. In a block 1206 of method 1200, transmission resources of the first communication medium are allocated among at least the first and second scheduler modules using a coordinator. In one example of block 1206, coordinator 222 schedules resources of communication medium among scheduler modules 216(1), 216(2), and 216(3).

Figure 13:
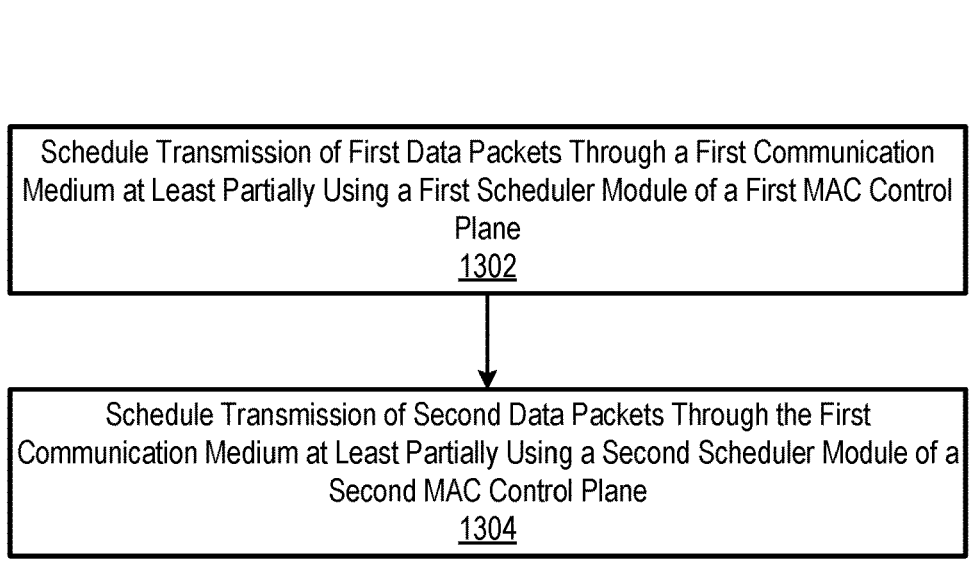
FIG. 13 is a flow chart of another method for scheduling data transmission in a communication network, according to an embodiment.

FIG. 13 is a flow chart of a method 1300 for controlling data transmission in a communication network. In a block 1302 of method 1300, transmission of first data packets through a first communication medium is scheduled at least partially using a first scheduling module of a first MAC control plane. In one example of block 1302, scheduler module 516(1) of MAC control plane 503(1) schedules transmission of first data packets through communication medium 212. In a block 1304 of method 1300, transmission of second data packets through the first communication medium is scheduled at least partially using a second scheduler module of second MAC control plane. In one example of block 1304, scheduler module 516(N) of MAC control plane 503(N) schedule transmission of second data packets through communication medium 212.

Combinations of Features

Features described above may be combined in various ways without departing from the scope hereof. The following examples illustrate some possible combinations.

(A1) A method for scheduling data transmission in a communication network includes (1) using a first scheduler module, scheduling first data packets for transmission via a first communication medium, (2) using a second scheduler module, scheduling second data packets for transmission via the first communication medium, and (3) using a coordinator, allocating transmission resources of the first communication medium among at least the first and second scheduler modules.

(A2) The method denoted as (A1) may further include (1) receiving an uplink scheduling request, and (2) routing the uplink scheduling request to one of the first scheduler module and the second scheduler module, based at least partially on one or more attributes of the uplink scheduling request.

(A3) Any one of the methods denoted as (A1) and (A2) may further include (1) receiving a downlink scheduling request, and (2) routing the downlink scheduling request to one of the first scheduler module and the second scheduler module, based at least partially on one or more attributes of the downlink scheduling request.

(A4) In any one of the methods denoted as (A1) through (A3), the first data packets may be part of a first data flow, and the second data packets may be part of a second data flow that is different from the first data flow.

(A5) In any one of the methods denoted as (A1) through (A4), the first data packets may comply with a first data transmission protocol, and the second data packets may comply with a second data transmission protocol that is different from the first data transmission protocol.

(A6) In any one of the methods denoted as (A1) through (A5), the first data packets may be associated with a first termination device communicatively coupled to the first communication medium, and the second data packets may be associated with a second termination device communicatively coupled to the first communication medium.

(A7) Any one of the methods denoted as (A1) through (A6) may further include providing flow control for the first and second data packets through the first communication medium using a common Media Access Control (MAC) data plane.

(A8) Any one of the methods denoted as (A1) through (A6) may further include (1) providing flow control for the first data packets through the first communication medium using a first Media Access Control (MAC) data plane, and (2) providing flow control for the second data packets through the second communication medium using a second MAC data plane that is different from the first MAC data plane.

(A9) Any one of the methods denoted as (A1) through (A8) may further include (1) facilitating physical transmission of the first data packets through the first communication medium using a first physical (PHY) layer of the communication network, and (2) facilitating physical transmission of the second data packets through the first communication medium using a second PHY layer of the communication network that is different from the first PHY layer of the communication network.

(A10) In any one of the methods denoted as (A1) through (A9), the resources of the first communication medium may include one or more of transmission time of the first communication medium and transmission frequency of the first communication medium.

(A11) In any one of the methods denoted as (A1) through (A10), the first communication medium may include one or more of a wireline communication medium and a wireless communication medium.

(A12) Any one of the methods denoted as (A1) through (A11) may further include (1) instantiating a third scheduler module in response to a first signal, and (2) scheduling third data packets for transmission via the first communication medium using the third scheduler module.

(A13) The method denoted as (A12) may further include allocating the transmission resources of the first communication medium among at least the first, second, and third scheduler modules, using the coordinator.

(A14) Any one of the methods denoted as (A12) and (A13) may further include terminating the third scheduler module in response to a second signal.

(A15) Any one of the methods denoted as (A1) through (A14) may further include reconfiguring the first scheduler module independently of the second scheduler module.

(B1) A method for controlling data transmission in a communication network includes (1) scheduling transmission of first data packets through a first communication medium at least partially using a first scheduler module of a first Media Access Control (MAC) control plane, and (2) scheduling transmission of second data packets through the first communication medium at least partially using a second scheduler module of a second MAC control plane.

(B2) The method denoted as (B1) may further include coordinating sharing of the first communication medium with the first and second scheduler modules.

(B3) Any one of the methods denoted as (B1) and (B2) may further include (1) controlling flow of the first data packets through the first communication medium at least partially using a first MAC data plane, and (2) controlling flow of the second data packets through the first communication medium at least partially using a second MAC data plane that is different from the first MAC data plane.

(B4) In any one of the methods denoted as (B1) through (B3), (1) the first data packets may be part of a first data flow, and (2) the second data packets may be part of a second data flow that is different from the first data flow.

(B5) In any one of the methods denoted as (B1) through (B4), (1) the first data packets may comply with a first data transmission protocol, and (2) the second data packets comply with a second data transmission protocol that is different from the first data transmission protocol.

(B6) In any one of the methods denoted as (B1) through (B5), (1) the first data packets may be associated with a first termination device communicatively coupled to the first communication medium, and (2) the second data packets may be associated with a second termination device communicatively coupled to the first communication medium.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for scheduling data transmission in a communication network, the method comprising:
   using a first scheduler module of a modular scheduler, scheduling first data packets for transmission via a first communication medium;
   while the first scheduler module is operational, automatically adding a second scheduler module to the modular scheduler in response to a first signal;
   using the second scheduler module, scheduling second data packets for transmission via the first communication medium;
   wherein:
      the first data packets comply with a first data transmission protocol, and
      the second data packets comply with a second data transmission protocol that is different from the first data transmission protocol; and
   using a coordinator, allocating transmission resources of the first communication medium among at least the first and second scheduler modules by writing respective grants for each of the first and second scheduler modules in a data store.

2. The method of claim 1, further comprising:
   receiving an uplink scheduling request; and
   routing the uplink scheduling request to one of the first scheduler module and the second scheduler module, based at least partially on one or more attributes of the uplink scheduling request.

3. The method of claim 1, further comprising:
   receiving a downlink scheduling request; and
   routing the downlink scheduling request to one of the first scheduler module and the second scheduler module, based at least partially on one or more attributes of the downlink scheduling request.

4. The method of claim 1, wherein:
   the first data packets are part of a first data flow; and
   the second data packets are part of a second data flow that is different from the first data flow.

5. The method of claim 1, wherein:
   the first data packets are associated with a first termination device communicatively coupled to the first communication medium; and
   the second data packets are associated with a second termination device communicatively coupled to the first communication medium.

6. The method of claim 1, further comprising providing flow control for the first and second data packets through the first communication medium using a common Media Access Control (MAC) data plane.

7. The method of claim 1, further comprising:
   providing flow control for the first data packets through the first communication medium using a first Media Access Control (MAC) data plane; and
   providing flow control for the second data packets through the first communication medium using a second MAC data plane that is different from the first MAC data plane.

8. The method of claim 1, further comprising:
   facilitating physical transmission of the first data packets through the first communication medium using a first physical (PHY) layer of the communication network; and
   facilitating physical transmission of the second data packets through the first communication medium using a second PHY layer of the communication network that is different from the first PHY layer of the communication network.

9. The method of claim 1, wherein the resources of the first communication medium comprise one or more of transmission time of the first communication medium and transmission frequency of the first communication medium.

10. The method of claim 1, wherein the first communication medium includes one or more of a wireline communication medium and a wireless communication medium.

11. The method of claim 1, further comprising: instantiating a third scheduler module in the modular scheduler in response to a second signal; and scheduling third data packets for transmission via the first communication medium using the third scheduler module.

12. The method of claim 11, further comprising allocating the transmission resources of the first communication medium among at least the first, second, and third scheduler modules, using the coordinator.

13. The method of claim 11, further comprising removing functionality of the third scheduler module from the modular scheduler, in response to a third signal.

14. The method of claim 1, further comprising reconfiguring the first scheduler module independently of the second scheduler module.

15. A method for controlling data transmission in a communication network, the method comprising:
   scheduling transmission of first data packets through a first communication medium at least partially using a first scheduler module of a first Media Access Control (MAC) control plane;
   scheduling transmission of second data packets through the first communication medium at least partially using a second scheduler module of a second MAC control plane;
   wherein:
      the first data packets comply with a first data transmission protocol, and
      the second data packets comply with a second data transmission protocol that is different from the first data transmission protocol;
   writing respective grants for each of the first and second scheduler modules in a data store to allocate transmission resources of the first communication medium among at least the first and second scheduler modules; and automatically removing the second scheduler module from the communication network, in response to a signal.

16. The method of claim 15, further comprising coordinating sharing of the first communication medium with the first and second scheduler modules.

17. The method of claim 15, further comprising:
controlling flow of the first data packets through the first communication medium at least partially using a first MAC data plane; and
controlling flow of the second data packets through the first communication medium at least partially using a second MAC data plane that is different from the first MAC data plane.

18. The method of claim 15, wherein:
the first data packets are part of a first data flow; and
the second data packets are part of a second data flow that is different from the first data flow.

19. The method of claim 15, wherein:
the first data packets are associated with a first termination device communicatively coupled to the first communication medium; and
the second data packets are associated with a second termination device communicatively coupled to the first communication medium.

20. The method of claim 1, wherein the first communication medium comprises a plurality of parallel communication signal paths.

21. The method of claim 20, wherein the plurality of parallel communication signal paths operate according to one or more of a cable data transmission communication protocol, a digital subscriber line (DSL) data transmission protocol, an optical data transmission protocol, a cellular wireless data transmission protocol, a Wi-Fi wireless data transmission protocol, a satellite wireless data transmission protocol, a Bluetooth wireless data transmission protocol, a Universal Series Bus (USB) data transmission protocol, and a home networking data transmission protocol.

22. The method of claim 15, wherein the first communication medium comprises a plurality of parallel communication signal paths.

23. The method of claim 22, wherein the plurality of parallel communication signal paths operate according to one or more of a cable data transmission communication protocol, a digital subscriber line (DSL) data transmission protocol, an optical data transmission protocol, a cellular wireless data transmission protocol, a Wi-Fi wireless data transmission protocol, a satellite wireless data transmission protocol, a Bluetooth wireless data transmission protocol, a Universal Series Bus (USB) data transmission protocol, and a home networking data transmission protocol.

* * * * *